United States Patent [19]
Grasvoll

[11] 3,903,673
[45] Sept. 9, 1975

[54] MACHINE FOR PRODUCING A LOAD OF GOODS COMPRISING A PLURALITY OF LAYERS

[75] Inventor: Halvor Grasvoll, Stigbergsliden, Sweden

[73] Assignee: Aktiebolaget Platmanufaktur, Malmo, Sweden

[22] Filed: Feb. 8, 1973

[21] Appl. No.: 330,753

[30] Foreign Application Priority Data
Feb. 11, 1972 Sweden............................ 1690/72

[52] U.S. Cl. ...................... 53/162; 53/176; 53/184; 53/228; 206/497
[51] Int. Cl.² ................. B65B 35/50; B65B 11/26
[58] Field of Search ............ 53/30 S, 33, 162, 171, 53/176, 182, 184 S, 228, 229; 214/10.5 R; 206/451, 386

[56] References Cited
UNITED STATES PATENTS

| | | | |
|---|---|---|---|
| 2,979,871 | 4/1961 | Kieckhefer | 206/451 X |
| 3,236,024 | 2/1966 | Bradley | 53/198 R |
| 3,246,744 | 4/1966 | Maron | 214/10.5 R X |
| 3,389,813 | 6/1968 | Kat | 214/10.5 R |
| 3,516,226 | 6/1970 | Grasvoll | 53/182 X |
| 3,585,777 | 6/1971 | Pesch | 53/30 S X |
| 3,672,116 | 6/1972 | Ingmarson | 53/229 X |
| 3,695,426 | 10/1972 | Engelsberger | 53/30 S X |
| 3,788,462 | 1/1974 | Meincer | 53/30 S X |

Primary Examiner—Travis S. McGehee
Assistant Examiner—John Sipos
Attorney, Agent, or Firm—Harness, Dickey & Pierce

[57] ABSTRACT

A load arranged in superposed layers and wrapped in plastics film in a manner permitting elimination of the pallet support for the load. To enable the lifting legs of a fork lift truck to securely lift the entire load, the bottom layer of goods comprises a smaller number of articles than the layers positioned above, said bottom layer being so positioned that its edges terminate a considerable distance from the side edges of the layers above, whereby longitudinal spaces are formed in which the lifting legs of the truck may be inserted during transport of the load. Two webs of plastics film are used to enclose the entire load on all sides thereof and in such a manner that a completely integral unit is formed, the individual layers of which do not separate from one another, even when the individual articles making up the load are heavy and the load layers thus exposed to considerable tensile stresses. The invention also concerns a method of assembling and wrapping the load in plastics film and a machine for carrying out said assembly and wrapping.

4 Claims, 12 Drawing Figures

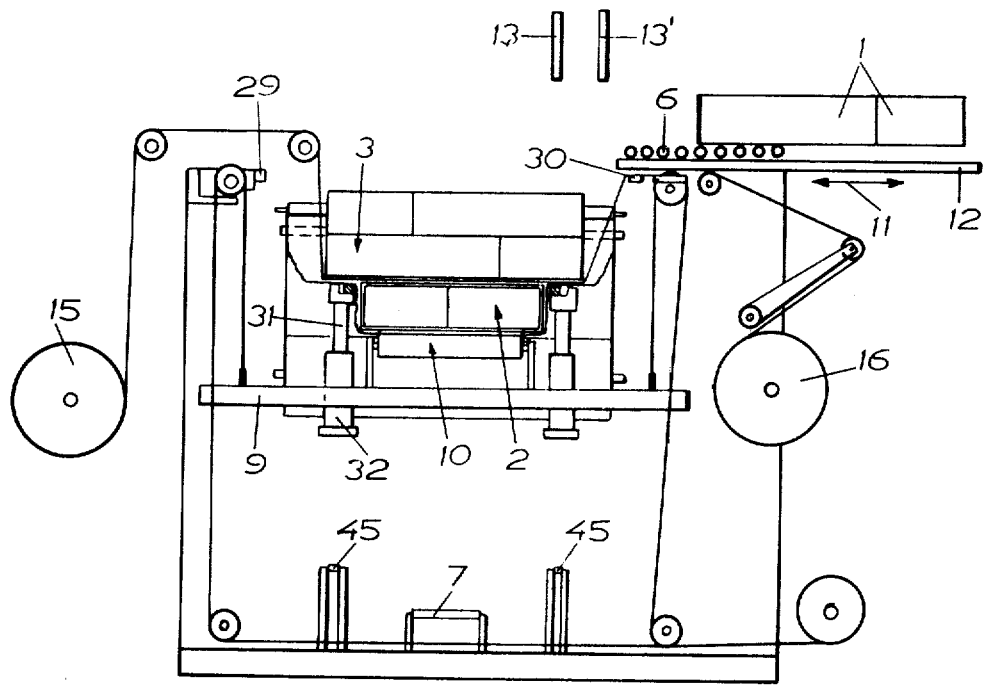
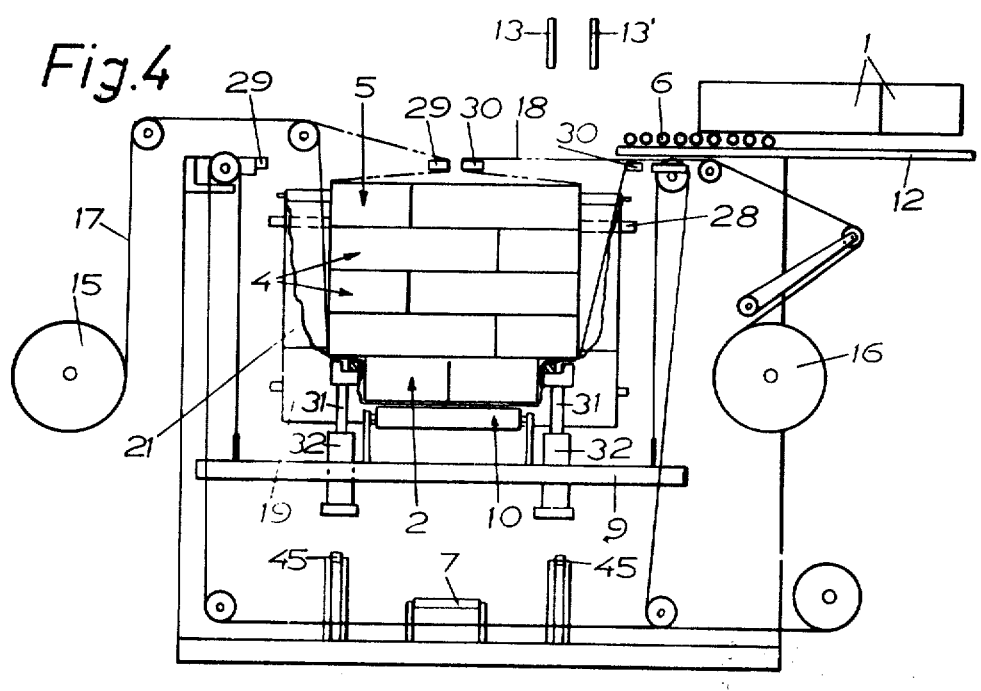

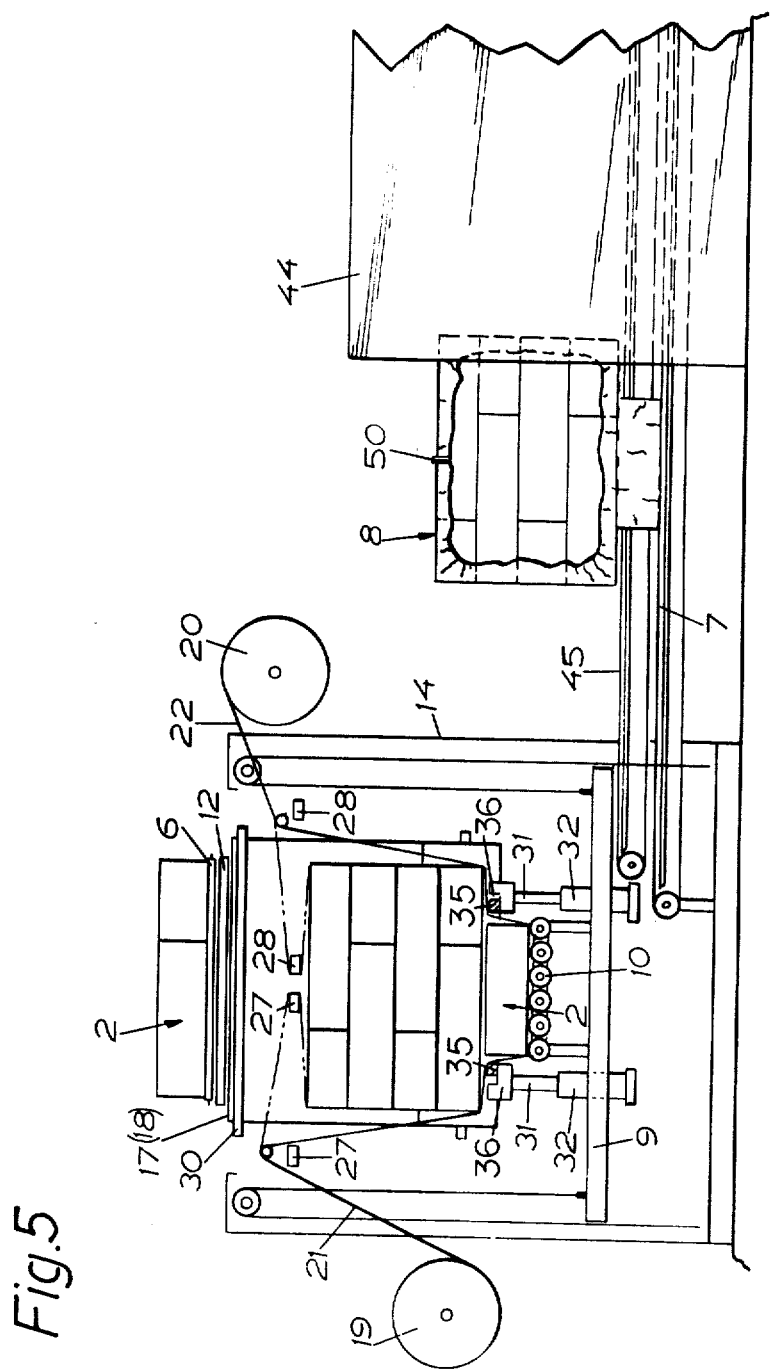

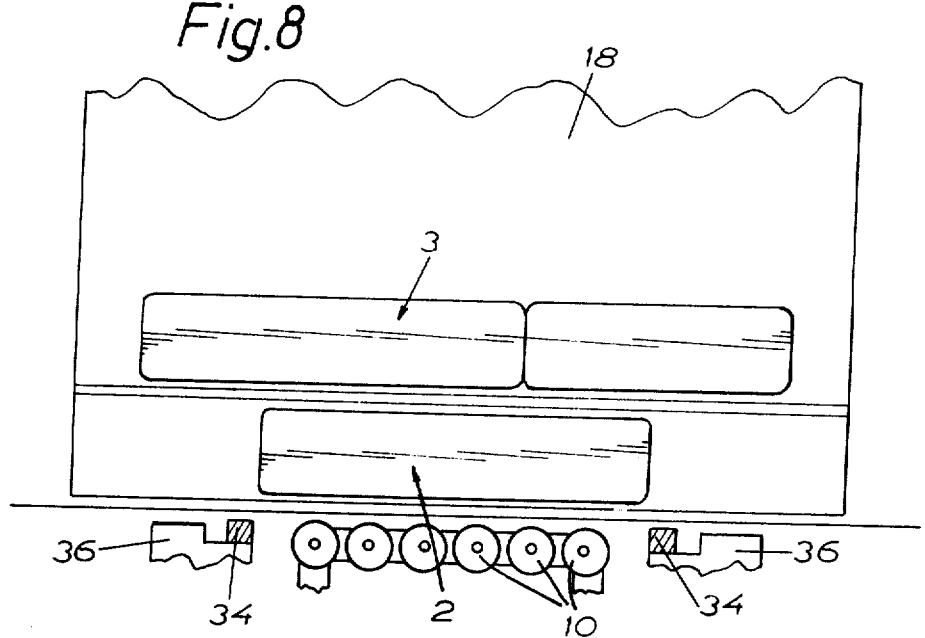
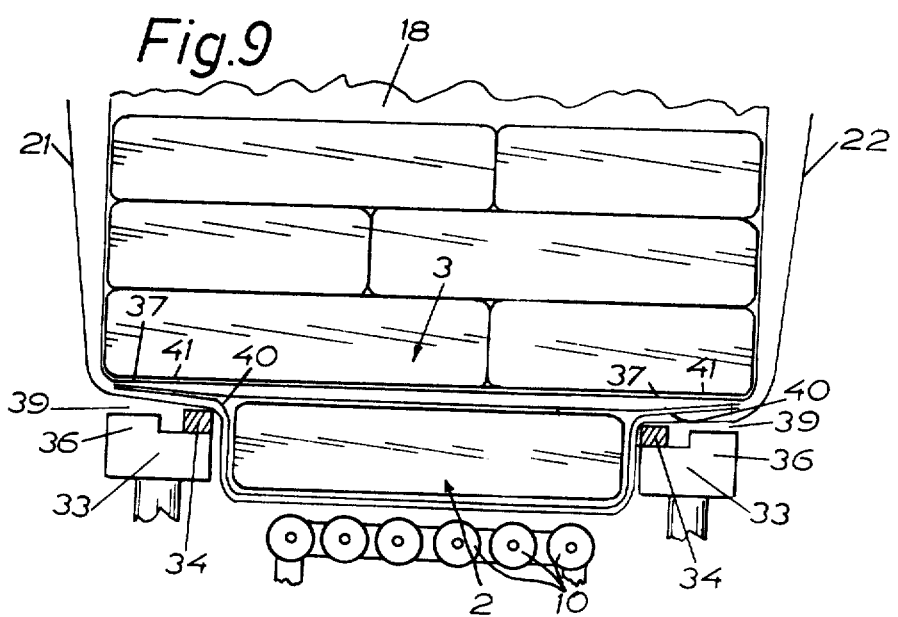

MACHINE FOR PRODUCING A LOAD OF GOODS COMPRISING A PLURALITY OF LAYERS

BACKGROUND OF THE INVENTION

Attempts have been made to wrap a load comprising one or several superposed layers of goods in shrinking plastics foil in such a manner that said load may be transported and moved by means of the lifting fork of a fork lift truck without being supported on a loading pallet. A condition therefor is that the lowermost or bottom layer of goods is narrower in width than the layer or layers positioned thereabove so that at least along two opposite sides of the bottom goods layer longitudinal spaces are formed which have downwardly directed shoulders beneath which the legs of the fork lift truck may engage. When a load of this kind is lifted, the bottom layer of goods will be supported by the shrinking film which, when the load is heavy, as is the case for instance when cement bags are handled, will be exposed to considerable tensile stresses with consequential risk of separation.

SUMMARY OF THE INVENTION

The purpose of the present invention is to remedy this drawback and make it possible to arrange such loads and wrap them in a completely automated way in plastics film, such as shrinking film, without loading pallets being necessary in the handling of these loads. More precisely, in accordance with the method of the invention a layer of goods is deposited on a plastics film which has previously been positioned so as to extend above a vertically displaceable support, such as a roller table, whereafter the support is lowered one step, a second and wider layer of goods being thereafter deposited at the middle of the first layer of goods and so on, whereafter, when the desired number of layers have been stacked one upon the other, the film is finally pulled over the uppermost layer of goods and its ends welded together at this point. It is characteristic of the invention that before the first layer of goods is deposited on the first plastics film, a second plastics film is positioned intermediate the support and the first film, at right angles thereto, said second film being welded along its longitudinal marginal portions to the first film at those marginal portions of said first film as extend beyond the bottom layer of goods and also at those portions of said first film as extend along the lower face of the outer edges of the layer of goods immediately above, and in that the second film is pulled over the uppermost layer of goods on top of the portion of the first film extending over this top layer, whereafter the ends of the second film are interconnected by welding. Owing to the second film being welded to the marginal portions of the first film enclosing the bottom layer, this bottom layer of goods will, during lifting of the entire load, be securely retained by said second film, which film is chosen sufficiently strong to be able to withstand the stresses exerted thereon. The joint will be particularly strong when the edges of the first plastics film extending outside the bottom layer of goods are pulled up towards that portion of the first plastics film as extend along the lower face of the broader layer of goods positioned above, and joined to said film portion through welding along the exposed shoulder positioned in this area on the lower face of the second layer of goods in succession and when also the marginal portions of the second plastics film are joined to the first plastics film at this point through welding.

The invention also concerns a machine for performing the method outlined above and a load wrapped in the manner indicated.

BRIEF DESCRIPTION OF THE DRAWINGS

The invention will be described more in detail in the following with reference to the accompanying drawings, wherein FIGS. 1,2,3, and 4 are side views of a machine in accordance with the invention, illustrating schematically the various stages of arranging a load in accordance with the invention, FIG. 5 is a side view of the same machine, as seen at an angle of 90° relative to the view illustrated in FIGS. 1–4, FIG. 8 illustrates approximately the same stage of loading but in a side view as seen at an angle of 90° relative to the view shown in FIG. 7, FIG. 9 is a similar view to the one shown in FIG. 8 but in a slightly later stage of handling.

DETAILED DESCRIPTION OF A PREFERRED EMBODIMENT

Figure 1:
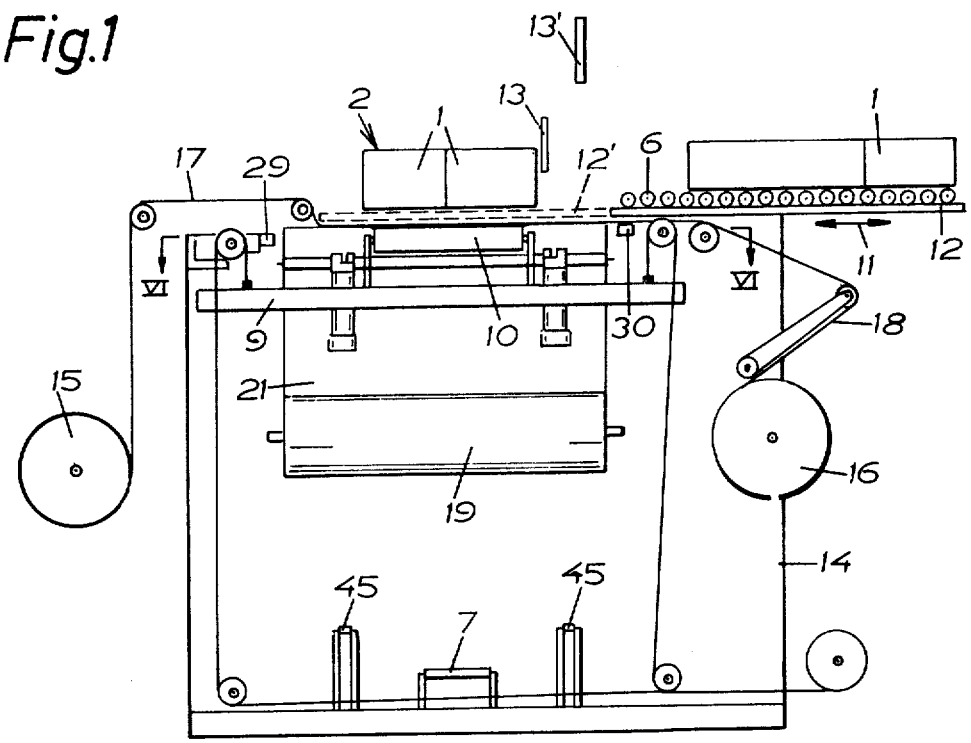

The machine illustrated in the drawings and intended for stacking goods 1 in layers 2, 3, 4, and 5, one above the other, is provided at its top portion with one conveyor 6 for feeding goods into the machine, and one conveyor 7 for discharging from the machine the load 8 when the operations of stacking and wrapping it in plastics film have been completed. The machine also comprises an elevator carriage 9 having a roller table 10 which from an upper position (see FIG. 1) almost level with the conveyor 6 may be lowered in steps over a distance which corresponds to the height of the associated layer of goods, i.e. layers 2–5. Below the conveyor 6 in the direction illustrated by double arrow 11 is displaceably mounted a feeder plate 12 which may move to the position 12' illustrated in dash-and-dot lines in FIG. 1 above the roller table 10, past a vertically displaceable stripper means 13. In the machine stand 14 are mounted two supply rolls 15, 16 holding shrinking film, the webs 17, 18 of said films extending transversely across the roller table and having their ends interconnected there by welding. The machine stand 14 also supports two additional supply rollers 19, 20 holding shrinking film, the webs 21, 22 thereof extending in the initial stage over the roller table 10 below the first shrinking film webs 17, 18, crossing said webs at an angle of 90° and having their ends interconnected by welding above the roller table. Furthermore, the machine comprises two pairs of welding heads 27, 28 and 29, 30, respectively, which are operated by piston and cylinder units 23, 24 and 25, 26, respectively and by means of which the film webs 21, 22 and 17, 18, respectively, may be moved into contact with one another and welded together as will be more closely described in the following.

The elevator carriage 9 supports a vertically displaceable frame 33 which is operated by piston-and-cylinder units 31 and 32 and which is provided with welding heads 34 and 35. The internal transverse dimensions of said frame slightly exceeds the outer transverse dimensions of the bottom layer 2 of goods. The frame 33 furthermore presents upright support ribs 36 intended to support from below at a somewhat lower level than welding heads 34, 35, the outer marginal portions of the second successive layer 3 of goods.

Figure 2:
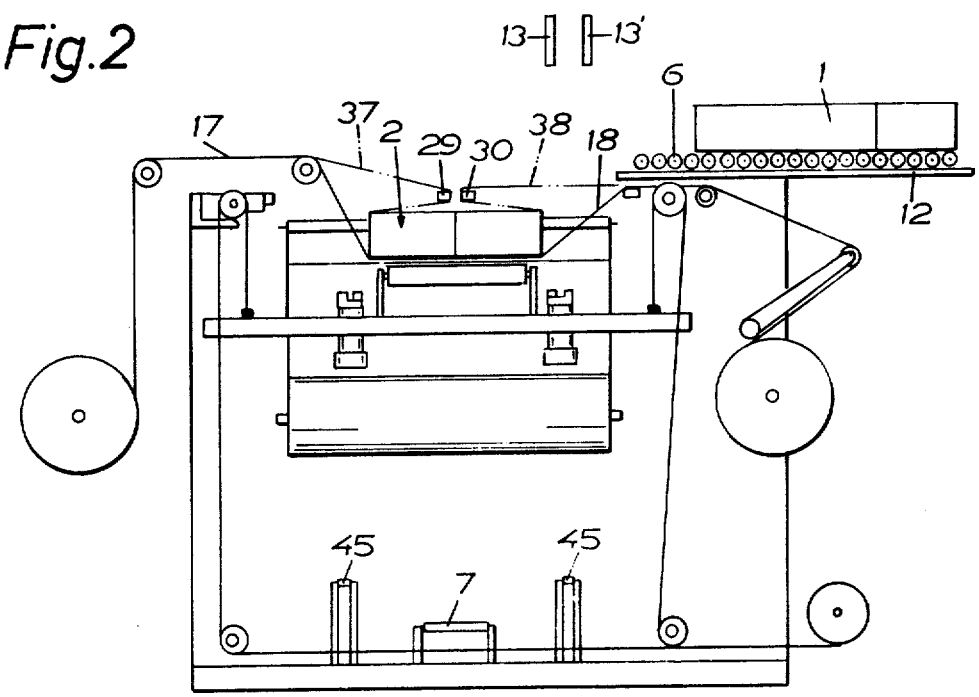
Figure 6:
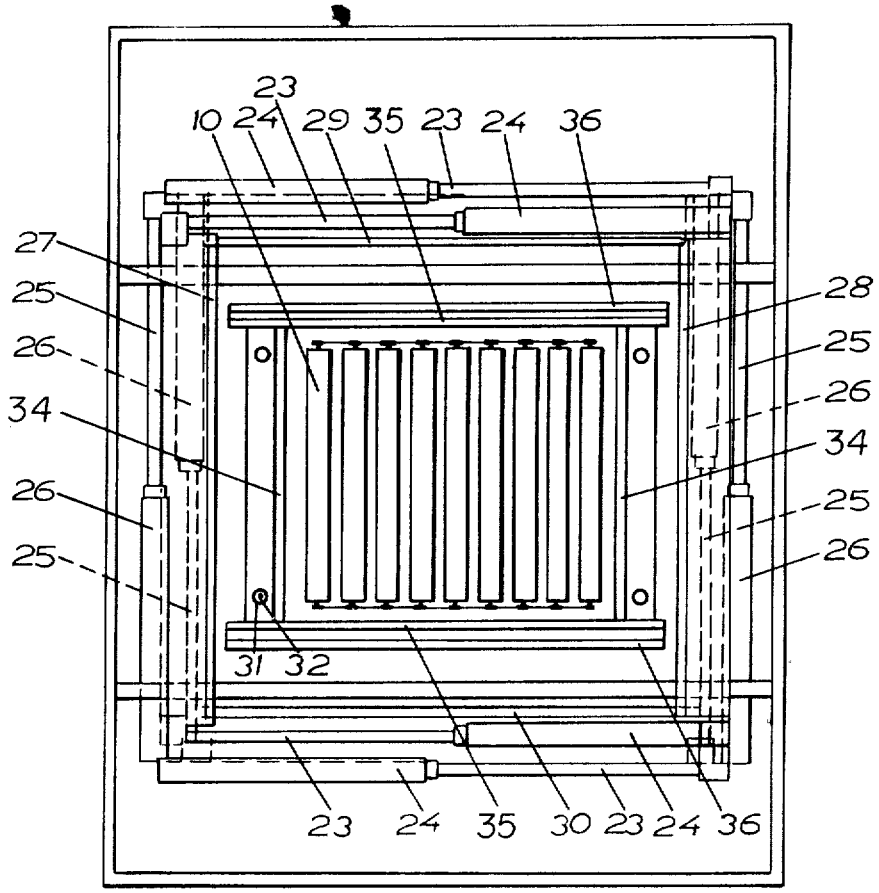
FIG. 6 illustrates on an enlarged scale a horizontal section through the machine along line VI—VI of FIG. 1.

The assembly of the load 8 and the wrapping thereof in shrinking film is performed in the following manner with the aid of the machine in accordance with the invention. A number of articles 1 are fed by the conveyor 6 to the left in accordance with FIG. 1 down onto the feeder plate 12 which moves at the same speed to the left, up to a position centrally above the roller table 10, which in the initial position is located closely above the feeder plate in the position illustrated by 12' in FIG. 1. The stripper means 13 is lowered into operative position and prevents the articles 1, upon return of the feeder plate 12 to the initial position thereof (indicated with full lines in FIG. 1), from moving together with said plate. The bottom layer 2 of goods thus advanced therefore will be positioned at the centre of the roller table 10 and rest on film webs 17, 18 and 21, 22. The elevator carriage 9 is lowered one step, whereupon the welding heads 29, 30 are displaced by the piston-and-cylinder units 23, 24 into contact with one another, while pulling with them the two film webs 17, 18 such that these will cover the bottom layer 2 of goods (see FIG. 2) and be welded together at this point. The welding heads 29, 30 thereafter immediately return to their original positions (FIG. 1). A second layer 3 of goods, comprising a larger number of articles, is thereafter advanced in the same manner by means of the feeder plate 12 and deposited above the roller table 10, whereupon a second stripper means, designated 13', is lowered, forcing said second layer 3, upon return of the feeder plate 12, into assuming a position on areas 37, 38 (FIG. 2) of the film webs 17 and 18. The elevator carriage 9 is lowered a further step, whereafter a third layer 4 of goods is advanced and stacked in the manner indicated, on top of the layer 3 of goods. The procedure is repeated, and when the uppermost layer 5 has been placed on the stack, the welding heads 29 and 30 are again moved into contact with one another (FIG. 4), the film webs 17 and 18 being then welded together along two narrow transverse fields and burnt off between these fields in a manner known per se.

Figure 7:
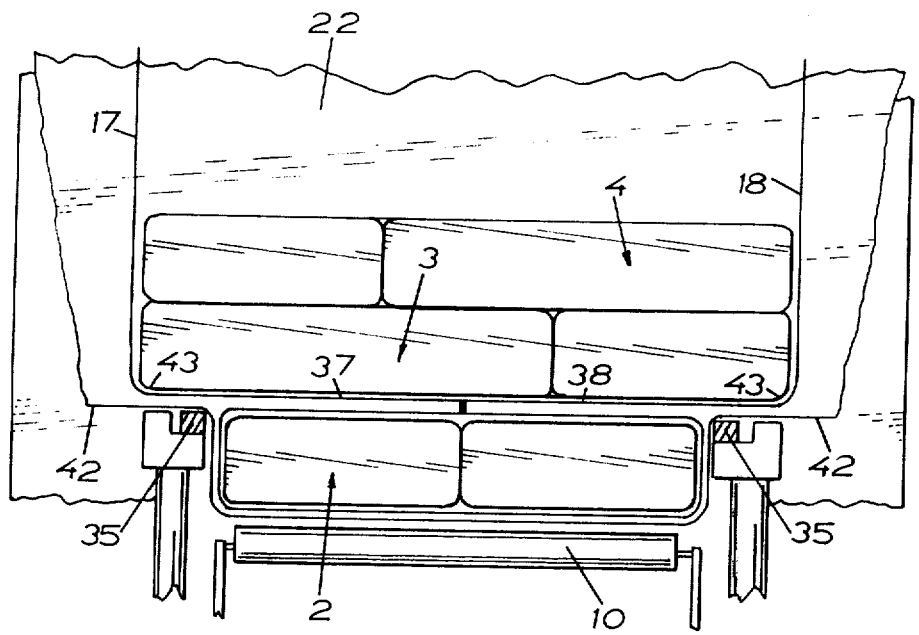
FIG. 7 illustrates on a still larger scale the load in accordance with the stage shown in FIG. 3.

Already when three layers of goods 2, 3, 4 have been placed on top of one another on the roller table 10 the piston-and-cylinder units 31, 32 were operated to elevate the frame 33 into the spaces 39 formed as a consequence of the transverse dimensions of the upper layers 3–5 exceeding those of the bottom layer 2, and the marginal portions 40 of the first film webs 17, 18, extending externally of the bottom layer were pressed by the welding heads 34 up against the film portions 37, 38 extending below the downwardly facing free shoulders 41 of the second layer 3 of goods and by means of welding the marginal portions 40 were secured to film portions 37, 38. At the same time, the marginal portions 42 (FIG. 7) of the film webs 21, 22 were moved by the welding plates 35 (FIG. 7) up towards and against the film portions 37, 38 opposite the other two downwardly facing shoulders 43 of the second layer 3 of goods. Upon connection of heat to the welding heads 34, 35, the film webs 17, 18 were welded to film webs 21, 22 in said places, resulting in a strong welded joint as a consequence of the excellent counter-pressure provided by the layers of goods on top and of the comparatively mild heat required, since there is ample time at hand for the welding operation, it being possible to weld while the uppermost layers 4 and 5 are still being deposited on the stack of goods.

Finally, the welding heads 27, 28 (FIG. 5) are brought together, pulling with them film webs 21, 22 which are welded together along two narrow transverse fields and burnt off between these fields in any conventional manner.

The load 8 (FIG. 5) is now completed and advanced by the conveyor 7 through a shrinking tunnel 44 of known construction, wherein the film arranged around the stack of goods is shrunk tightly around the load. During the transport of the load through the shrinking tunnel 44, the second layer 3 of goods is supported at its shoulders 43 by supporting bands 45 running at the speed of the conveyor 7. The same shoulders 41 are also supported during stacking by the carrier ribs 36 on the frame 33.

Figure 10:
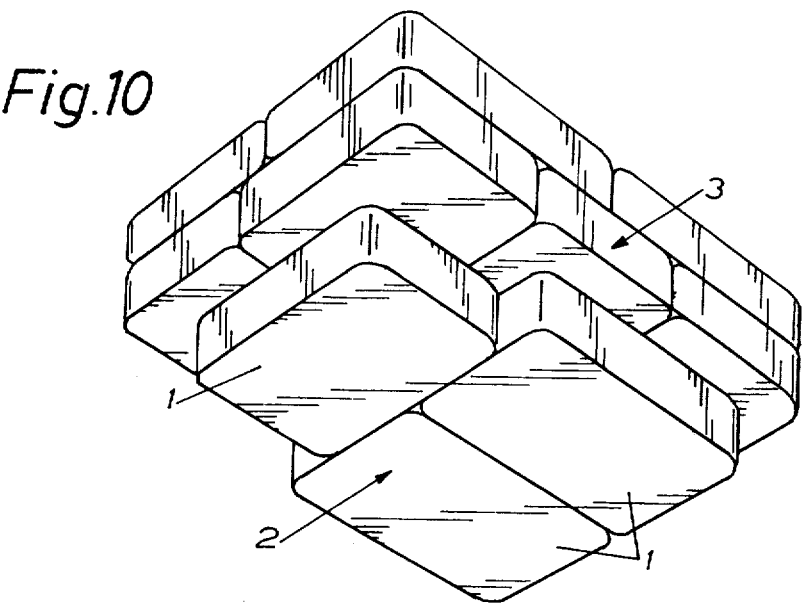
FIG. 10 shows in a perspective view from beneath the lower portion of a load having been arranged in a particular loading pattern.

As understood from the above, transfer of the articles 1 from the conveyor 6 to the stack of goods and the wrapping of said stack in shrinking films are carried out in a completely automatized way. It is then also possible to choose various packing patterns for the articles making up the stack. In FIG. 10 is illustrated a packing pattern according to which three articles 1 are positioned in close relationship so as to form the bottom layer 2, whereas each one of the upper layers 3, 4 and any subsequent layers comprises five articles, closely packed together and in an order ensuring that the layers of goods "bind" one another.

Figure 12:
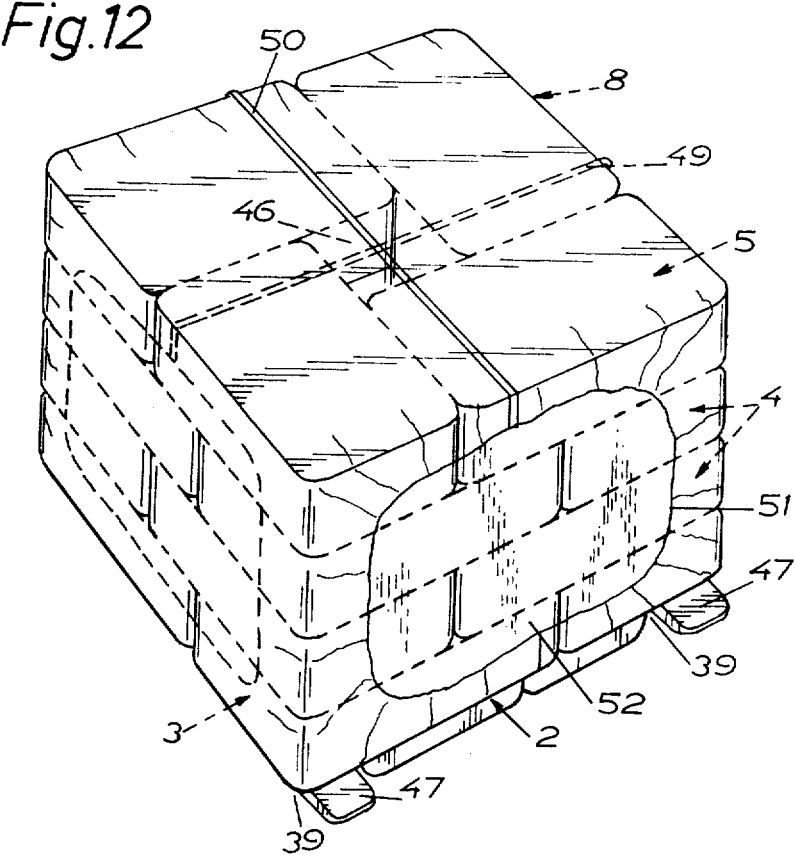
FIG. 12 shows in a perspective view from above a load wrapped in two plastics film in accordance with the invention and the loading pattern illustrated in FIG. 11.
Figure 11:
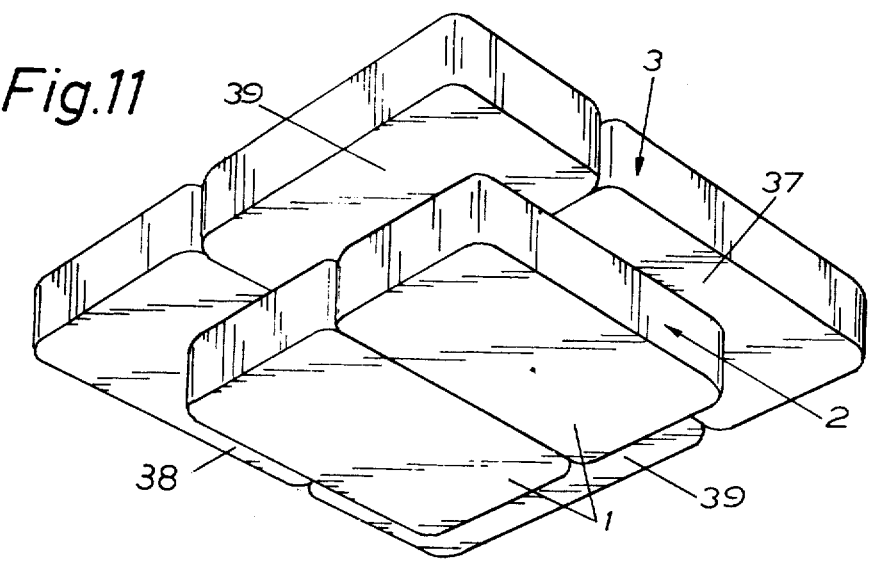
FIG. 11 is a similar perspective view but shows a load arranged in accordance with a different loading pattern.

In FIGS. 11 and 12, on the other hand, the bottom layer of goods 2 only comprises two articles 1 positioned closely adjacent one another whereas each one of the upper layers 3, 4, and any subsequent layer comprises four articles 1, positioned close to one another in a square pattern about a central opening 46. Also in this case the individual articles in the various layers bind one another. In FIG. 12 is also indicated the manner in which the two legs 47 of the lifting fork of a fork lift truck (not shown), upon lifting of the load, will engage in the spaces 39 formed below the second layer 3 of goods, outside the bottom layer 2. FIG. 12 also shows the extension of the welding seams 49 and 50 between film webs 17, 18, and 21, 22, respectively, at the top of the load 8.

In order not to clutter the drawings unnecessarily certain details have been omitted therefrom. For instance, the piston-and-cylinder units 23, 24 and 25, 26 operating the welding plates 27, 28, 29 and 30 are not included in FIGS. 1–5. The electric motors for driving the conveyors 6 and 7, the elevator carriage 9, the supporting bands 45 and the rollers for the roller table 10 as well as the electric control means to start and stop the various functions of the apparatus likewise are omitted from the drawings, since those skilled in the art are well acquainted with such means. Other plastics film than shrinking film may be used. As an example may be mentioned so-called stretch film.

If a water-tight enclosure of the articles of the load 8 is desired it is possible, after the shrinking operation, to weld the outer marginal portions 51 (FIG. 12) of the film webs 21, 22 to the portions 52 of the other two film webs 17, 18 positioned internally thereof. To give satisfactory results, this welding probably is best carried out manually.

We claim:

1. A machine comprising a stand, a support vertically displaceable in said machine stand, a conveyor, a feeder means arranged to receive goods in layers from said conveyor, transfer of goods from said conveyor onto said feeder beginning when said support is in its uppermost position, a stripper means for transferring each individual layer of goods from said feeder means onto said support or onto a layer or layers of goods previously deposited on said support, respectively, upon movement of said feeder in a direction away from said stripper means, and a first device for discharging two first webs of plastics film in a direction towards one another for enclosing said load comprising superposed layers of goods, whereupon said first webs of film are welded together, a second device for discharging in a direction towards one another and at right angles to said first web two second webs of a second plastics film to deposit said second webs intermediate said support and said first plastics film, and a device for welding together said second webs of said second film on top of the film portion of said first plastic film extending on top of the uppermost layer of goods, the improvement comprising means for welding said second webs of said second film to said first plastic film along marginal portions thereof extending outside opposite ends of said bottom layer of goods.

2. The improved machine as claimed in claim 1, the improvement comprising a device for interconnecting said first webs of said first film above the upper face of said bottom layer of goods, and welding together said webs at this point, said device precluding severing of said welded webs for permitting said film webs to extend from the point of welding backwards to a position wherein said webs will be covered by the next layer of goods.

3. The improved machine as claimed in claim 1, the improvement comprising welding heads positioned externally of said vertically displaceable support, said welding heads being arranged to weld said second film along the edges thereof to that portion of said first film extending along the lower face of the layer positioned immediately above said bottom layer.

4. The improved machine as claimed in claim 2, the improvement comprising welding heads positioned externally of said vertically displaceable support, said welding heads being arranged to weld said second film along the edges thereof to that portion of said first film extending along the lower face of the layer positioned immediately above said bottom layer.

* * * * *